(12) United States Patent
Andersen et al.

(10) Patent No.: US 7,240,062 B2
(45) Date of Patent: Jul. 3, 2007

(54) SYSTEM AND METHOD FOR CREATING A SEARCHABLE WORD INDEX OF A SCANNED DOCUMENT INCLUDING MULTIPLE INTERPRETATIONS OF A WORD AT A GIVEN DOCUMENT LOCATION

(75) Inventors: Timothy L. Andersen, Boise, ID (US); Frederick A. Zarndt, Springville, UT (US); Robert B. Wille, Mapleton, UT (US); Michael E. Rimer, Provo, UT (US); Michael U. Bailey, Richfield, UT (US); G. Bret Millar, Highland, UT (US); E. Derek Rowley, Aberdeen, WA (US)

(73) Assignee: iArchives, Inc., Orem, UT (US)

( * ) Notice: Subject to any disclaimer, the term of this patent is extended or adjusted under 35 U.S.C. 154(b) by 0 days.

(21) Appl. No.: 10/049,016

(22) PCT Filed: Mar. 6, 2001
(Under 37 CFR 1.47)

(86) PCT No.: PCT/US01/07127

§ 371 (c)(1),
(2), (4) Date: Jun. 8, 2004

(87) PCT Pub. No.: WO01/67378

PCT Pub. Date: Sep. 13, 2001

(65) Prior Publication Data

US 2005/0060273 A1 Mar. 17, 2005

Related U.S. Application Data

(60) Provisional application No. 60/187,362, filed on Mar. 6, 2000.

(51) Int. Cl.
*G06F 7/00* (2006.01)

(52) U.S. Cl. ............... 707/100; 707/102; 707/104.1; 715/500; 382/229

(58) Field of Classification Search ............... 707/100, 707/104.1; 382/229; 715/500
See application file for complete search history.

(56) References Cited

U.S. PATENT DOCUMENTS 3,988,715 A 10/1976 Mullan et al. ........ 340/146.3 S (Continued)

FOREIGN PATENT DOCUMENTS

EP 0 942 389 A2 9/1999

OTHER PUBLICATIONS

Manmatha et al., "Indexing Handwriting Using Word Matching", 1996, ACM, 0-89791-830-4/96/03, pp. 151-159.*

(Continued)

*Primary Examiner*—Don Wong
*Assistant Examiner*—Michael Le
(74) *Attorney, Agent, or Firm*—Kory D. Christensen; Stoel Rives, LLP (57) ABSTRACT

Multiple recognition engines (110) provide different interpretations (116) of a word at a given location within a scanned document (108). A word node corresponding to each unique interpretation is stored within a word index (102), with each word node being linked to word nodes of previously and subsequently recognized words.

30 Claims, 6 Drawing Sheets

U.S. PATENT DOCUMENTS

| | | | |
|---|---|---|---|
| 4,829,580 A | 5/1989 | Church | 381/52 |
| 5,029,223 A * | 7/1991 | Fujisaki | 382/187 |
| 5,131,053 A * | 7/1992 | Bernzott et al. | 382/176 |
| 5,454,046 A * | 9/1995 | Carman, II | 382/186 |
| 5,519,786 A * | 5/1996 | Courtney et al. | 382/159 |
| 5,617,488 A * | 4/1997 | Hong et al. | 382/229 |
| 5,706,365 A * | 1/1998 | Rangarajan et al. | 707/102 |
| 5,729,741 A * | 3/1998 | Liaguno et al. | 707/104.1 |
| 5,745,600 A | 4/1998 | Chen et al. | 382/218 |
| 5,805,747 A * | 9/1998 | Bradford | 382/310 |
| 5,875,263 A * | 2/1999 | Froessl | 382/181 |
| 5,953,451 A * | 9/1999 | Syeda-Mahmood | 382/187 |
| 6,098,034 A * | 8/2000 | Razin et al. | 704/9 |
| 6,269,188 B1 * | 7/2001 | Jamali | 382/229 |
| 6,608,930 B1 * | 8/2003 | Agnihotri et al. | 382/176 |

OTHER PUBLICATIONS

Marukawa, K., Hu, T., Fujisawa, H., and Shima, Y. "Document Retrieval Tolerating Character Recognition Errors—Evaluation and Application." Pattern Recognition, vol. 30, No. 8, 1997, pp. 1361-1371.

Kameshiro, T., Hirano, T., Okada, Y., Yoda, F. "A Document Image Retrieval Method Tolerating Recognition and Segmentation Errors of OCR Using Shape-Feature and Multiple Candidates." Document Analysis and Recognition, 1999. ICDAR '99. Proceedings of the Fifth International Conference on Bangalore, India, Sep. 20-22, 1999, Los Alamitos, CA, USA, IEEE Comput. Soc. US, Sep. 20, 1999, pp. 681-684.

\* cited by examiner

SYSTEM AND METHOD FOR CREATING A SEARCHABLE WORD INDEX OF A SCANNED DOCUMENT INCLUDING MULTIPLE INTERPRETATIONS OF A WORD AT A GIVEN DOCUMENT LOCATION

RELATED APPLICATIONS

The present application is related to and claims priority from U.S. Provisional Patent Application No. 60/187,362, filed Mar. 6, 2000 for "System and Method for Converting Archived Data into Searchable Text," with inventors G. Bret Millar, Timothy L. Andersen, and E. Derek Rowley, which is incorporated herein by reference in its entirety. The present application also claims priority to PCT Application Ser. No. PCT/US01/07127, which was filed on Mar. 6, 2001 and is likewise incorporated herein by reference in its entirety.

BACKGROUND

1. The Field of the Invention

The present invention relates generally to the field of optical character recognition (OCR). More specifically, the present invention relates to a system and method for creating a searchable word index of a scanned document including multiple interpretations of a word at a given location within the document.

2. Technical Background

In the field of optical character recognition (OCR), analog documents (e.g., paper, microfilm, etc.) are digitally scanned, segmented, and converted into text that may be read, searched, and edited by means of a computer. In order to provide for rapid searching, each recognized word is typically stored in a searchable word index with links to the location (e.g., page number and page coordinates) at which the word may be found within the scanned document.

In some conventional OCR systems, multiple recognition engines are used to recognize each word in the document. The use of multiple recognition engines generally increases overall recognition accuracy, since the recognition engines typically use different OCR techniques, each having different strengths and weaknesses.

When the recognition engines produce differing interpretations of the same image of a word in the scanned document, one interpretation is typically selected as the "correct" interpretation. Often, the OCR system rely on a "voting" (winner takes all) strategy with the majority interpretation being selected as the correct one. Alternatively, or in addition, confidence scores may be used. For example, suppose two recognition engines correctly recognize the word "may" with confidence scores of 80% and 70%, respectively, while another recognition engine interprets the same input data as "way" with a 90% confidence score, while yet another recognition engine recognizes the input data as "uuav" with a 60% confidence score. In such an example, a combination of voting and confidence scores may lead to a selection of "may" as the preferred interpretation.

Unfortunately, by selecting a single interpretation and discarding the rest, the objectively correct interpretation is also frequently discarded. Often, image noise and other effects confuse a majority of the recognition engines, with only a minority of the recognition engines arriving at the correct interpretation. In the above example, the correct interpretation could have been "way," which would have been discarded using standard methods. Accordingly, conventional OCR systems have never been able to approach total accuracy, no matter how many recognition engines are employed.

What is needed, then, is a system and method for creating a searchable word index of a scanned document including multiple interpretations of a word at a given location within the document. What is also needed is a system and method for creating a searchable word index that selectively reduces the size of the index by eliminating interpretations that are not found in a dictionary or word list. In addition, what is needed is a system and method for creating a searchable word index that permits rescaling of a scanned document without requiring modification of location data within the word index.

BRIEF DESCRIPTION OF THE DRAWINGS

Non-exhaustive embodiments of the invention are described with reference to the figures, in which.

DETAILED DESCRIPTION OF THE PREFERRED EMBODIMENTS

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, user selections, network transactions, database queries, database structures, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Figure 1:
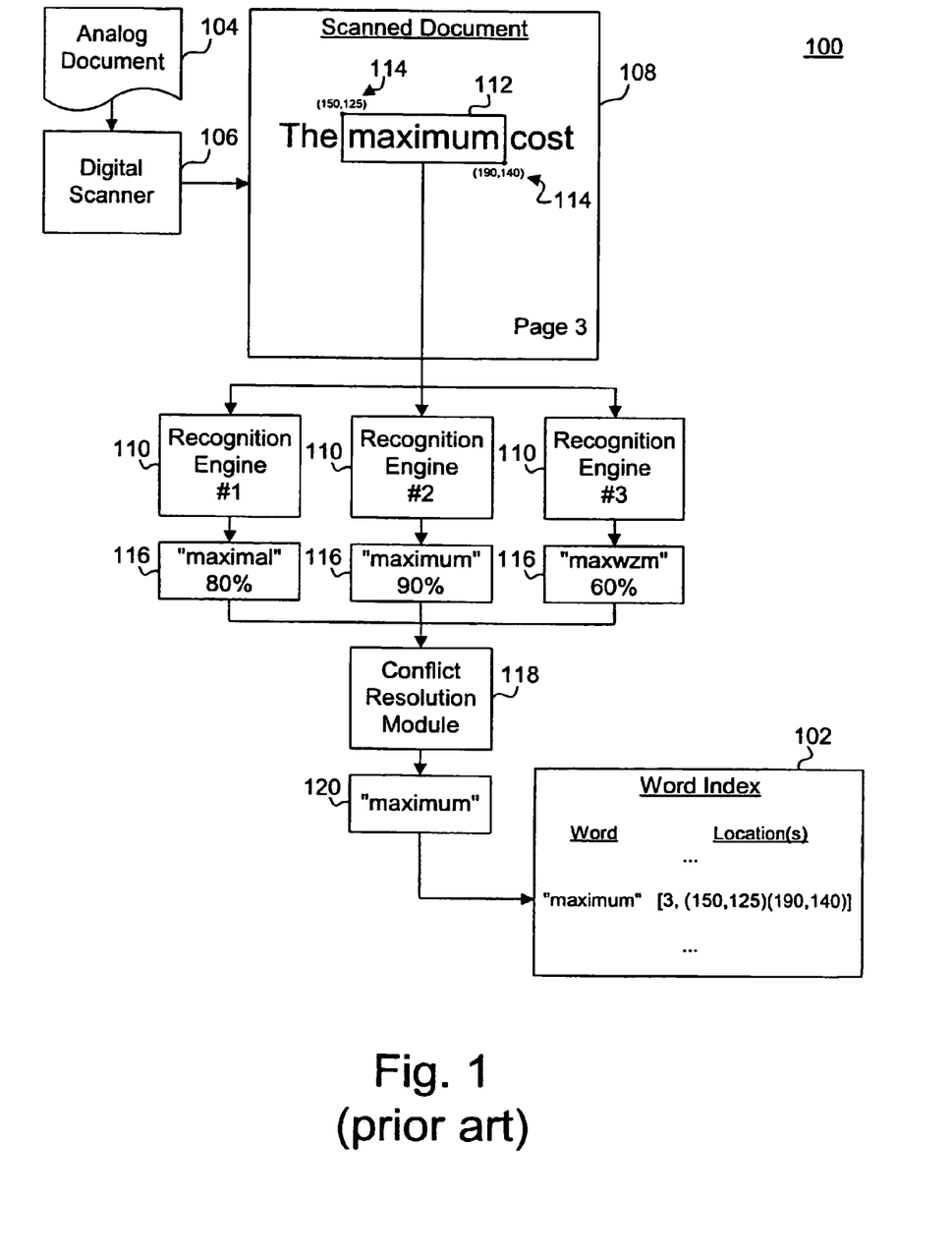
FIG. 1 is a block diagram of a conventional system for creating a searchable word index of a scanned document.

Referring now to FIG. 1, there is shown a conventional optical character recognition (OCR) system 100 that produces a searchable word index 102 from an analog document 104 (such as a paper or microfilm document). Initially, the analog document 104 is scanned by a digital scanner 106. Digital scanners 106 are well known in the art, such as the Hewlett Packard 9100C® digital sender, which is a high-speed, multi-page, networkable scanning device. The resolution of the digital scanner 106 is generally in excess of 300 dpi (dots per inch) in order to provide accurate recognition.

The output of the digital scanner 106 is a scanned document 108, also referred to herein as a document image. The scanned document 108 typically includes one or more bi-level bitmap images, each corresponding to a page of the analog document 104.

In the depicted embodiment, the OCR system 100 includes a plurality of recognition engines 110. Examples of standard recognition engines 110 include Finereader®, available from Abbyy USA of Fremont, Calif., and Omnipage®, available from Scansoft, Inc. of Peabody, Mass. As noted above, the use of multiple recognition engines 110 generally increases overall recognition accuracy, since the recognition engines 110 typically use different OCR techniques, each having different strengths and weaknesses. For example, one recognition engine 110 may use a neural net-based OCR technique, while another recognition engine 110 may use a template-matching technique.

After the scanned document 108 is obtained, a segmentation module (not shown) reduces the document 108 into image segments corresponding to individual words (and other objects). Each image segment is marked by a bounding rectangle 112. Typically, a bounding rectangle is defined by a pair of coordinates 114 expressed in image pixels (e.g., x pixels down, y pixels across).

In some cases, each recognition engine 110 may include a separate segmentation module, providing different segmentations of the same document 108.

After the scanned document 108 is segmented, a particular image segment marked by a bounding rectangle 112 is selected for recognition. Thereafter, each recognition engine 110 attempts to recognize the word contained within the selected image segment and provides its own interpretation 116.

In some cases, the interpretation 116 may be accompanied by a confidence score. For example, a confidence score of 90% may indicate that a recognition engine 110 is 90% confident that its interpretation is correct. The confidence score is influenced by numerous factors, which are beyond the scope of the present discussion, but well known to those of skill in the art.

In a conventional OCR system 100, each interpretation 116, including any confidence score, is provided to a conflict resolution module 118, which selects a single preferred interpretation 120 for storage in the word index 102. Various techniques may be used to select the preferred interpretation 120. Typically, a voting technique is used, where a majority of the recognition engines 110 agree on a preferred interpretation 120. In other cases, the confidence score may be used to more heavily weight the "vote" of a particular recognition engine 110.

Normally, the non-selected interpretations 116 are discarded, while the preferred interpretation 120 is inserted into the word index 102. The word index 102 typically associates the preferred interpretation 120 with the location of the corresponding word in the scanned document 108 (as indicated by the bounding rectangle 112). Where a scanned document 108 includes multiple pages, a page number may also be included with the location data.

The implementation details of a word index 102 may vary from system to system. For example, a word index 102 may be implemented in the context of a relational database. In alternative embodiments, hashing techniques may be used. The precise structure and organization of a word index 102 is not crucial to the invention.

After each of word of the scanned document 108 has been recognized and entered into the word index 102, a search engine (not shown) may use the word index 102 to rapidly locate a given word within the scanned document 108. For example, a user may enter the word "maximum," after which the search engine returns a location on page 3, with a bounding rectangle of "(150,125)(190,140)."

As previously noted, one disadvantage of conventional OCR systems 100 is the fact that a majority of the recognition engines 110 can sometimes be wrong. Thus, by selecting a single preferred interpretation 120 and discarding the rest, the objectively correct interpretation is also frequently discarded. Accordingly, conventional OCR systems 100 have never been able to approach total accuracy, no matter how many recognition engines 110 are employed.

Figure 2:
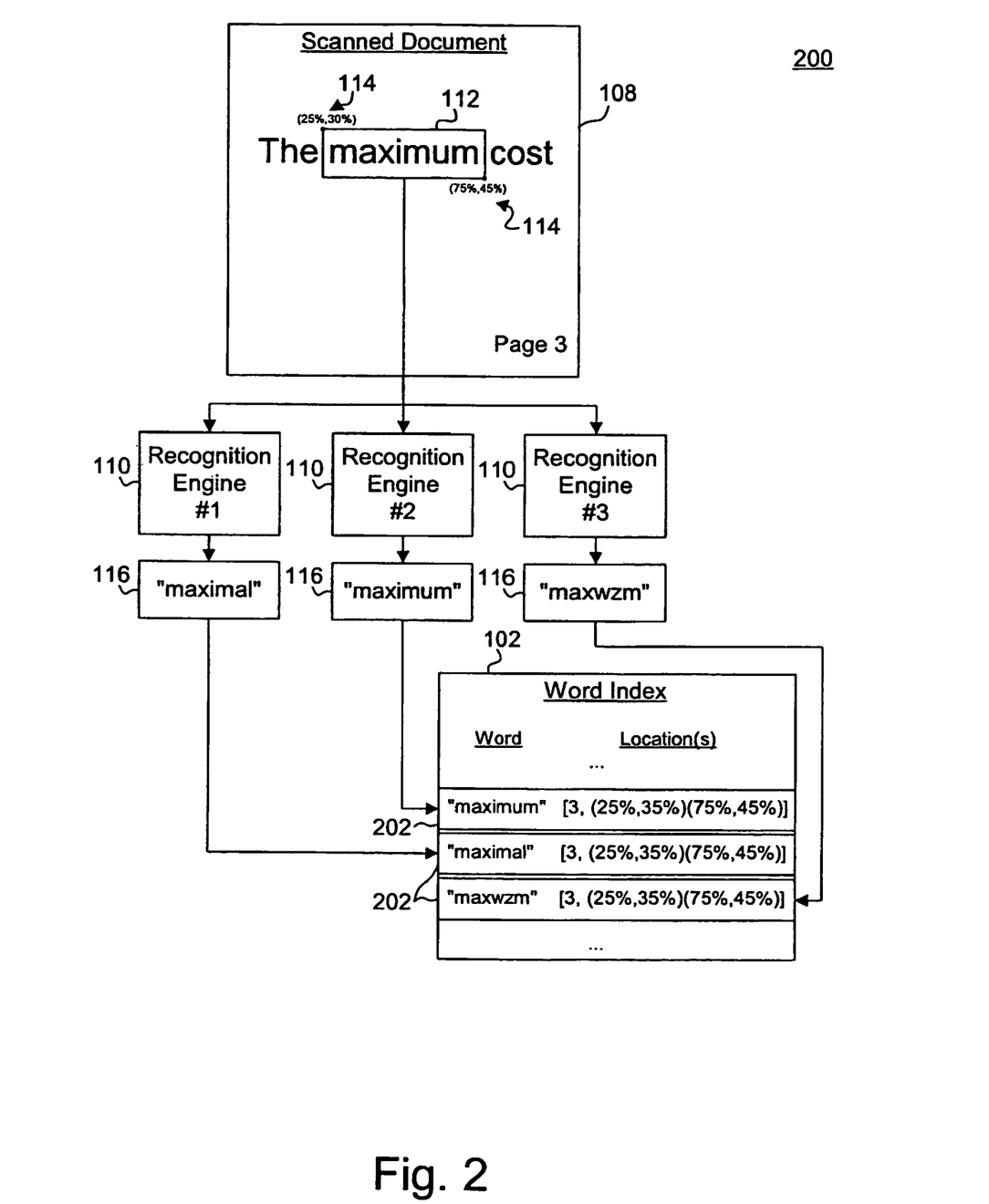
FIG. 2 is a block diagram of a system for creating a searchable word index of a scanned document including multiple interpretations for a word at a given location within the document.

Referring now to FIG. 2, there is shown a system 200 for creating a searchable word index 102 of a scanned document 108 including multiple interpretations for a word at a given location within the document 108. As described above, a plurality of recognition engines 110 arrive at independent interpretations 116 of a word within a bounding rectangle 112. In one embodiment, the recognition engines 110 may operate in parallel using a multi-threaded operating system. Alternatively, the recognition engines 110 may operate serially on the same input data.

Unlike the conventional OCR system 100, however, each unique interpretation 116 is stored in the word index 102 with an indication of the corresponding word's location (e.g., bounding rectangle 112). For example, if three recognition engines 110 interpret a word as "may," while one recognition engine 110 interprets the same word as "way," both "may" and "way" are added to the word index 102. Thus, the system 200 does not rely on a conflict resolution module 118 to select a single preferred interpretation 120.

Moreover, unlike conventional approaches, the coordinates 114 of the bounding rectangle 112 are represented, in one embodiment, as percentages of the length or width, as appropriate, of the scanned document 108. This allows for simplified re-scaling of the scanned document 108 without requiring modification of location data within the word index 102.

As used herein, an association between the interpretation 116 of a word and its location is called a "word node" 202. Thus, for each interpretation 116, a word node 202 is inserted into the word index 102. A word node 202 may be embodied as any suitable data structure or combination of data structures.

The above-described approach has a significant impact on keyword search accuracy when compared to conventional approaches. On the assumption that OCR errors between recognition engines 110 are uncorrelated, the probability that a correct interpretation 116 of a word is recognized (and thus returned by a user search on that word) by at least one recognition engine 110 is $$1-((1-A_1)\cdot(1-A_2)\cdot \ldots \cdot(1-A_n)) \qquad \text{Eq. 1}$$

where $A_i$ is the word accuracy of recognition engine i; and
n is the number of recognition engines 110 applied to the scanned document 108.

This probability asymptotically approaches 100 percent as the number of recognition engines 110 increases. For example, if there are two recognition engines 110, each of which has only a 60% probability of recognizing the correct word, the probability that at least one of them will correctly identify the word is $$1-(1-0.60)^2=84\%$$

If a $3^{rd}$, 60% accurate recognition engine 110 is added, the probability goes to $$1-(1-0.60)^3=93.4\%$$

This compares with the 60% probability of correctly recognizing the word and returning the document on a phrase search on that word if the output of only one of the engines 110 is selected.

Figure 3:
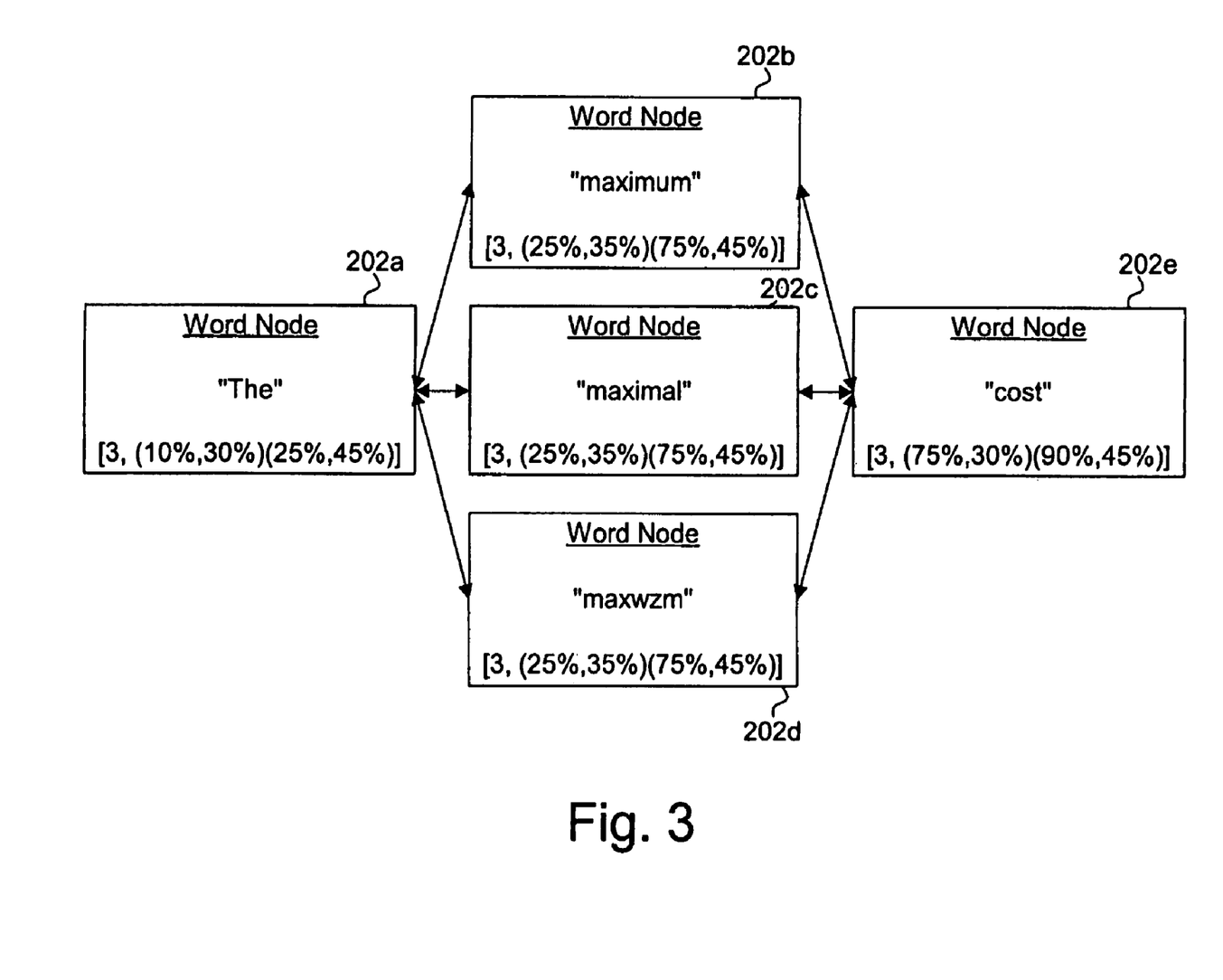
FIG. 3 is block diagram of linked word nodes.

In one embodiment, as shown in FIG. 3, each word node 202 is linked to the word node(s) 202 corresponding to each interpretation 116 of the previous and next word in the scanned document 108. For example, the word node 202e corresponding to "cost" is linked bi-directionally to the word nodes 202b-d corresponding to "maximum, "maximal," and "maxwzm." Likewise, the word nodes 202b-d are linked bi-directionally to the word node 202a corresponding to "The." In alternative embodiments, unidirectional linking may be used. Links may be implemented using any suitable technique, such as pointers, key fields, and the like, which may or may not be embedded within the word nodes 202.

In one embodiment, the bi-directional linking is used to facilitate phrase searching. As shown in FIG. 3, the insertion of multiple word nodes 202 for different interpretations 116 of a word results in multiple phrase paths, which provides for increased accuracy during phrase searching. For example, in a conventional approach where an incorrect interpretation 116 is inserted into the word index 102, e.g. "maximal" instead of "maximum," a phrase search for "the maximum cost" would not result in a hit. By contrast, using the word index 102 of the present invention, a phrase search for "the maximum cost" would be successful.

Figure 4:
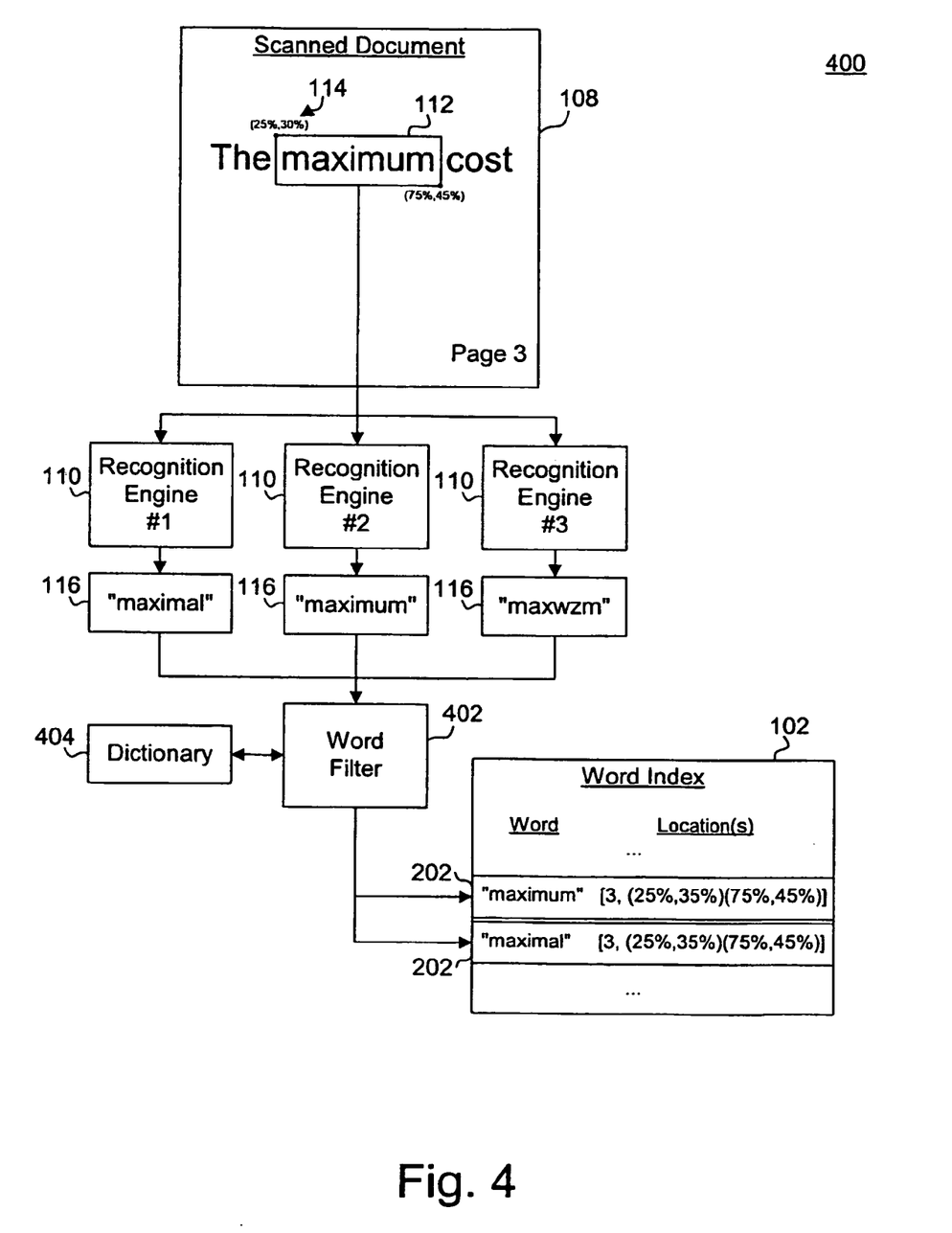
FIG. 4 is a block diagram of a system for creating a searchable word index including a word filter in communication with a dictionary.

FIG. 4 illustrates an alternative embodiment of a system 400 in accordance with the present invention in which a word filter 402 eliminates one or more of the interpretations 116 generated by the recognition engines 110. Unlike standard approaches, multiple word nodes 202 are still inserted into the word index 102 for different interpretations 116 of the same word. However, where a particular interpretation 116 is not found within a dictionary 404 or other word list, a word node 202 is not inserted into the word index 102 in one embodiment.

In general, where an interpretation 116 is not found within the dictionary 404, the likelihood that the interpretation 116 will be correct is relatively low. By eliminating improbable interpretations 116, the size of the word index 102 is reduced and response time is increased. Accuracy is not diminished, however, since it is unlikely that a user would search for a word that is not in the dictionary 404.

Of course, certain interpretations 116 may still be indexed despite not being found in the dictionary 404. For example, acronyms, proper nouns, and technical words may still be inserted into the word index 102 regardless of whether they are found in the dictionary 404 or other word list.

In one embodiment, interpretations 116 containing improbable character triplets are also eliminated. An improbable character triplet is a series of three characters that does not exist in a dictionary 404. For example, the interpretation 116 generated by the third recognition engine 110 of FIG. 4, i.e. "maxwzm," contains an improbable character triplet, i.e. "xwz."

Figure 5:
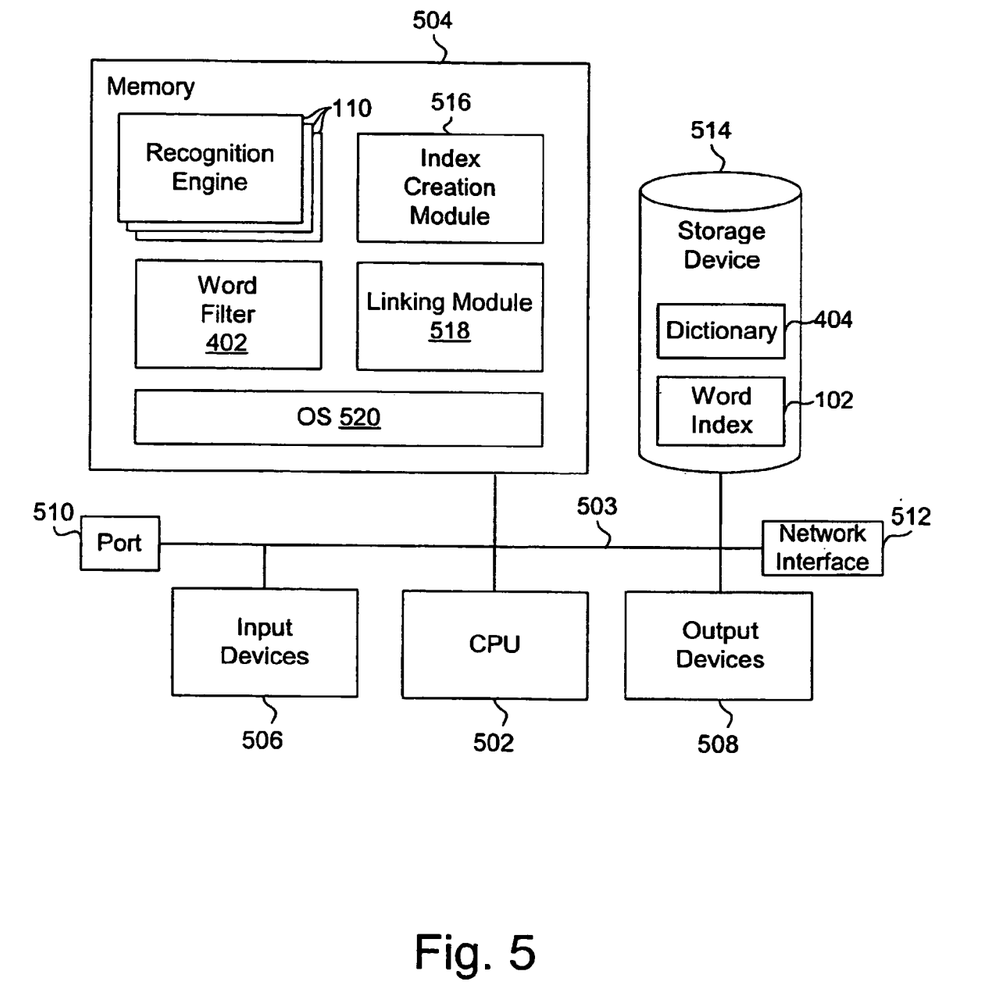
FIG. 5 is a physical block diagram of a computer system for creating a searchable word index of a scanned document including multiple interpretations for a word at a given location within the document.

FIG. 5 is a schematic block diagram of a hardware architecture for the systems 200 and 400 of FIGS. 2 and 4, respectively. In one embodiment, a central processing unit (CPU) 502 executes instructions stored in a memory 504, such as a random access memory (RAM) and/or read only memory (ROM).

The CPU 502 may be in electrical communication with one or more input devices 506, such as a mouse and/or keyboard. The CPU 502 may be coupled to the input devices 506, as well as the other illustrated components, via a bus 503.

Likewise, the CPU 502 may be in electrical communication with one or more output devices 508, such as a monitor and/or printer. In various embodiments, the CPU 502 may also be coupled to one or more ports 510, such as an RS-232, printer, and/or USB port. Similarly, the CPU 502 may be coupled to a network interface 512, such as an Ethernet adapter.

In one embodiment, the CPU 502 is in electrical communication with a storage device 514, such as a hard disk drive, CD-ROM, and/or DVD-ROM. The storage device 514 may be used to store the dictionary 404, the word index 102, and various software modules to be loaded into the memory 504 during operation of the systems 200 and 400.

In one embodiment, the memory 504 stores a plurality of recognition engines 110. In addition, the memory 504 stores an index creation module 516, which receives the interpretations 116 of the recognition engines 110 and stores corresponding word nodes 202 in the word index 102 using the techniques described with reference to FIG. 2. In alternative embodiments, an index creation module 516 may be incorporated into one or more of the recognition engines 110.

The memory 504 may also store a linking module 518, which links each word node 202 to the word node(s) 202 corresponding to each interpretation 116 of the previous and next word in the scanned document 108, as described in connection with FIG. 3. The linking module 518 may be integrated with the index creation module 516 in certain embodiments.

The memory 504 may also store an operating system (OS) 520, such as Windows 2000® or Linux®, which manages and provides resources to the above-described software modules. In alternative embodiments, the software modules depicted within the memory 504 may be implemented as hardware or firmware.

Of course, the hardware architecture illustrated in FIG. 5 may be embodied in various configurations without departing from the spirit and scope of the invention. In addition, certain standard components known to those of skill in the art are not illustrated in order to avoid obscuring aspects of the invention.

Figure 6:
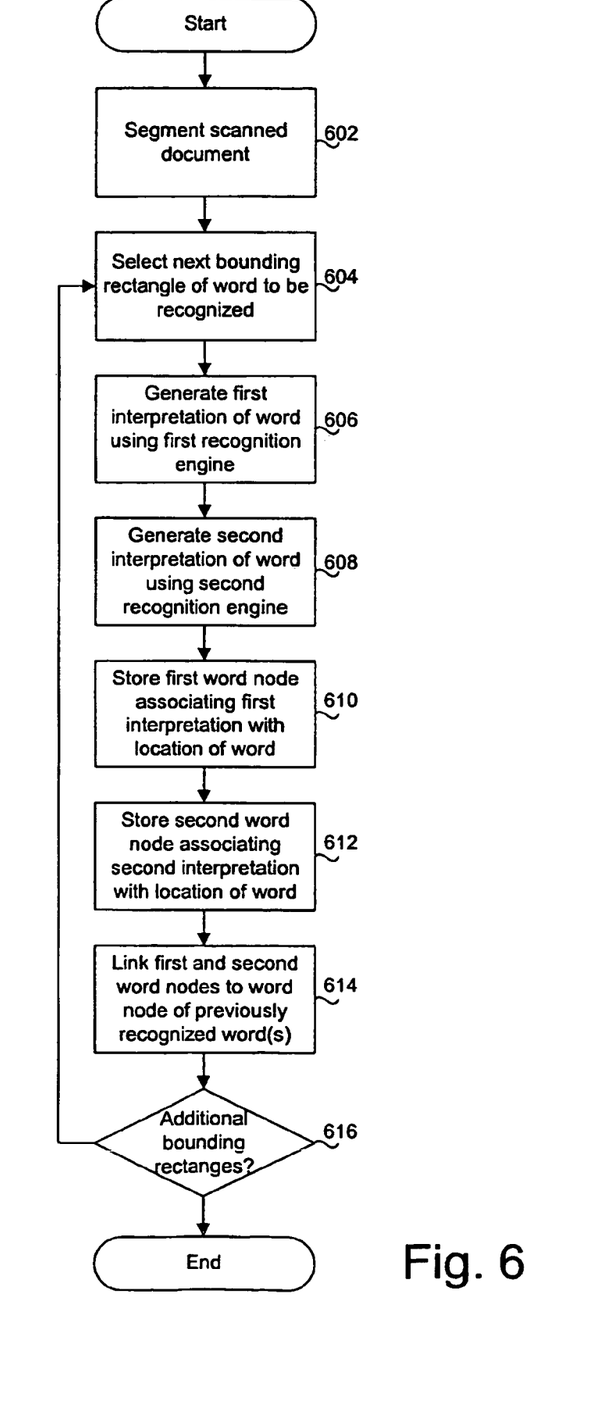
FIG. 6 is a flowchart of a method for creating a searchable word index of a scanned document including multiple interpretations for a word at a given location within the document.

Referring now to FIG. 6, there is shown a flowchart of method 600 for creating a searchable word index 102 of a scanned document 108 including multiple interpretations of a word at a given location within the document 108. The method 600 begins by segmenting 602 a scanned document 108 generated by a digital scanner 106. Any conventional segmentation process may be used to reduce the scanned document 108 into a plurality of image segments marked by bounding rectangles 112. Thereafter, a next bounding rectangle 112 is selected 604 for recognition.

In one embodiment, a first interpretation 116 of a word within the selected bounding rectangle 112 is generated 606 by a first recognition engine 110. Thereafter, a second interpretation 116 of the word is generated 608 by a second recognition engine 110. Any number of additional recognition engines 110 may be used to generate additional interpretations 116.

Next, a first word node 202 is stored 610 in the word index 102. In one embodiment, the first word node 202 associates the first interpretation 116 of the word with the location (e.g., bounding rectangle 112) of the word within the scanned document 108. Similarly, a second word node 202 is stored 612 in the word index 102. In one configuration, the second word node 202 associates the second interpretation 116 of the word with the location (e.g., bounding rectangle 112) of the word within the scanned document 108.

In certain embodiments, the method 600 continues by linking 614 the first and second word nodes 202 to one or more word nodes 202 corresponding to interpretations 116 of the previously recognized word from the scanned document 108. As noted above, the linking may be bi-directional and is used to facilitate phrase searching.

A determination 616 is then made whether additional bounding rectangles 112 within the scanned document 108 need to be recognized. If so, the method 600 returns to step 604 to select the next bounding rectangle 112. Otherwise, the method 600 is complete.

Based upon the foregoing, the present invention offers a number of advantages not found in conventional approaches. By storing word nodes 202 corresponding to all of the unique interpretations 116 of a word, accuracy in a keyword search is significantly enhanced. In addition, by eliminating interpretations 116 not found in a dictionary 404, index size and search time is reduced, without impacting accuracy. Moreover, by defining bounding rectangles 112 using percentage-based coordinates 114, the scanned document 108 may be easily rescaled without the requirement for modifying locations within the index 102.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method in a computer system for creating a searchable word index of a scanned document, the method comprising:
    generating a first interpretation of a word at a given location within the scanned document using a first recognition engine;
    generating a second interpretation of the word using a second recognition engine, wherein the second interpretation is different from the first interpretation;
    storing a first word node in the searchable word index associating the first interpretation of the word and the location of the word within the scanned document;
    storing a second word node in the searchable word index associating the second interpretation of the word and the location of the word within the scanned document; and
    linking the first and second word nodes to at least one word node of an adjacent word from the scanned document.

2. The method of claim 1, wherein the first and second recognition engines employ different optical character recognition (OCR) techniques.

3. The method of claim 1, wherein the location of the word is defined by a bounding rectangle.

4. The method of claim 3, wherein the bounding rectangle is defined by at least two coordinates, each coordinate comprising a percentage of a width and a height of the scanned document.

5. The method of claim 1, wherein the adjacent word comprises a subsequent word in the scanned document.

6. The method of claim 5, wherein the first and second word nodes are each bidirectionally linked to adjacent words from the scanned document on opposite sides of the word.

7. The method of claim 1, further comprising:
    generating a third interpretation of the word using a third recognition engine;
    determining whether the third interpretation of the word is contained within a word list; and
    storing a third word node in the searchable word index when the third interpretation of the word is contained within the word list, the third word node associating the third interpretation of the word and the location of the word within the scanned document.

8. The method of claim 7, wherein the word list comprises a dictionary.

9. The method of claim 1, further comprising:
    generating a third interpretation of the word using a third recognition engine;
    determining whether the third interpretation of the word contains an improbable character triplet;
    storing a third word node in the searchable word index when the third interpretation of the word does not contain an improbable character triplet, the third word node associating the third interpretation of the word and the location of the word within the scanned document.

10. The method of claim 9, wherein an improbable character triplet comprises three consecutive characters not found within a word of a dictionary.

11. A system for creating a searchable word index of a scanned document, the system comprising:
    a first recognition engine stored on a computer readable medium and configured to generate a first interpretation of a word at a given location within the scanned document;
    a second recognition engine stored on a computer readable medium and configured to generate a second interpretation of the word, wherein the second interpretation is different from the first interpretation;
    an index creation component stored on a computer readable medium and configured to store first and second word nodes in the searchable word index, the first word node associating the first interpretation of the word and the location of the word within the scanned document and the second word node associating the second interpretation of the word and the location of the world within the scanned document; and
    a linking component stored on a computer readable medium and configured to link the first and second word nodes to a word node of an adjacent word from the scanned document.

12. The system of claim 11, wherein the first and second recognition engines employ different optical character recognition (OCR) techniques.

13. The system of claim 11, wherein the location of the word is defined by a bounding rectangle.

14. The system of claim 13, wherein the bounding rectangle is defined by at least two coordinates, each coordinate comprising a percentage of a width and a height of the scanned document.

15. The system of claim 11, wherein the linking component is configured to bidirectionally link the first and second word nodes to adjacent words from the scanned document on opposite sides of the word.

16. The system of claim 11, further comprising:
a third recognition engine configured to generate a third interpretation of the word using a third recognition engine; and
a word filter configured to determine whether the third interpretation of the word is contained within a word list;
wherein the index creation component is further configured to store a third word node in the searchable word index when the third interpretation of the word is contained within the word list, the third word node associating the third interpretation of the word and the location of the word within the scanned document.

17. The system of claim 16, wherein the word list comprises a dictionary.

18. The system of claim 11, further comprising:
a third recognition engine configured to generate a third interpretation of the word using a third recognition engine; and
a word filter configured to determine whether the third interpretation of the word contains an improbable character triplet;
wherein the index creation component is further configured to store a third word node in the searchable word index when the third interpretation of the word does not contain an improbable character triplet, the third word node associating the third interpretation of the word and the location of the word within the scanned document.

19. The system of claim 18, wherein an improbable character triplet comprises at three consecutive characters not found within a word of a dictionary.

20. A computer program product on a computer-readable medium for creating a searchable word index of a scanned document, the computer program product comprising:
program code for generating a first interpretation of a word at a given location within the scanned document using a first recognition engine;
program code for generating a second interpretation of the word using a second recognition engine, wherein the second interpretation is different from the first interpretation;
program code for storing a first word node in the searchable word index associating the first interpretation of the word and the location of the word within the scanned document;
program code for storing a second word node in the searchable word index associating the second interpretation of the word and the location of the word within the scanned document; and
program code for linking the first and second word nodes to at least one word node of an adjacent word from the scanned document.

21. The computer program product of claim 20, wherein the first and second recognition engines employ different optical character recognition (OCR) techniques.

22. The computer program product of claim 20, wherein the location of the word is defined by a bounding rectangle.

23. The computer program product of claim 22, wherein the bounding rectangle is defined by at least two coordinates, each coordinate comprising a percentage of a width and a height of the scanned document.

24. The computer program product of claim 20, wherein the adjacent word comprises a subsequent word in the scanned document.

25. The computer program product of claim 24, wherein the program code for linking the first and second word nodes is configured to bidirectionally link the first and second word nodes to adjacent words from the scanned document on opposite sides of the word.

26. The computer program product of claim 20, further comprising:
program code for generating a third interpretation of the word using a third recognition engine;
program code for determining whether the third interpretation of the word is contained within a word list; and
program code for storing a third word node in the searchable word index when the third interpretation of the word is contained with the word list, the third word node associating the third interpretation of the word and the location of the word within the scanned document.

27. The computer program product of claim 26, wherein the word list comprises a dictionary.

28. The computer program product of claim 20, further comprising:
program code for generating a third interpretation of the word using a third recognition engine;
program code for determining whether the third interpretation of the word contains an improbable character triplet; and
program code for storing a third word node in the searchable word index when the third interpretation of the word does not contain an improbable character triplet, the third word node associating the third interpretation of the word and the location of the word within the scanned document.

29. The computer program product of claim 28, wherein an improbable character triplet comprises three consecutive characters not found within a word of a dictionary.

30. The method of claim 1, wherein both the first and the second interpretations of the word are searchable in the word index and may be identified by performing a search of the word index.

* * * * *